UNITED STATES PATENT OFFICE.

MAX Y. SEATON, OF MIDLAND, MICHIGAN, ASSIGNOR TO THE DOW CHEMICAL COMPANY, OF MIDLAND, MICHIGAN, A CORPORATION OF MICHIGAN.

CELLULOSE-ESTER SOLVENT AND RESULTING CELLULOSIC COMPOSITION.

1,397,986.     Specification of Letters Patent.     Patented Nov. 22, 1921.

No Drawing.     Application filed January 16, 1920. Serial No. 351,916.

*To all whom it may concern:*

Be it known that I, MAX Y. SEATON, a citizen of the United States, and a resident of Midland, county of Midland, and State of Michigan, have invented a new and useful Improvement in Cellulose-Ester Solvents and Resulting Cellulosic Compositions, of which the following is a specification, the principle of the invention being herein explained and the best mode in which I have contemplated applying that principle, so as to distinguish it from other inventions.

The present improved solvent is designed more especially for use in making lacquers having a cellulose ester, particularly cellulose nitrate or nitro-cellulose as the base. I have found that chlorpropyl acetate, which may be readily prepared from propylene chlorhydrin ($CH_3.CHOH.CH_2Cl$) is an excellent solvent for nitro cellulose, comparing very favorably with amyl acetate and giving bright clear solutions which dry to a clear brilliant and elastic film. The chlorpropyl acetate itself is a liquid boiling at about 145° C., is practically insoluble in water, and is relatively stable; that is, it does not either hydrolyze or split off chlorin when used in lacquers. The chlorpropyl acetate, as usually produced, will contain small amounts of the acetates of chlorhydrins formed from higher olefins, that is, from butylene, amylene, etc. While it is possible to separate these materials by fractionation, such acetates of the higher chlorin derivatives of the series also have valuable properties as solvents, comparable with those of chlorpropyl acetate and so usually will be allowed to remain with the latter. Acetates of the isomeric propylene chlorhydrin, $CH_3.CHCl.CH_2OH$, may also be present.

In addition to such chlorpropyl acetate, whether or not there be included therewith such other acetates, I may use other usual solvents and non-solvents such as have found employment in cellulosic compositions intended for use as lacquers. The invention, then, consists of the ingredients hereinafter fully described and particularly pointed out in the claims, the following description setting forth merely one of several different combinations of ingredients that may be employed in carrying out the spirit of the invention.

While reference has heretofore been made more particularly to cellulose nitrate or nitro-cellulose, it should be explained at the outset that chlorpropyl acetate is an equally good solvent for cellulose acetate, although the prospects are that it will not be as widely used for this purpose as said nitro-cellulose, because it does not appear to have as promising a future as a constituent of lacquers.

Irrespective of the particular cellulose ester, whether nitrate or acetate, I have found that a suitable solvent employing chlorpropyl acetate as the characteristic constituent may be made by adding to said acetate an approximately equal quantity of alcohol and approximately twice the quantity of benzol. The last mentioned ingredient, it will be understood, serves merely as a diluent or a vehicle as it would be called in ordinary paints or varnish. A typical lacquer formula, then, containing such chlorpropyl acetate as the active solvent, and utilizing cellulose nitrate as a base, would be as follows, viz. 4 parts cellulose nitrate, 25 parts chlorpropyl acetate, 20 parts alcohol, and 55 parts benzol.

The cellulose nitrate may be added to the chlorpropyl acetate alone or to a mixture of the latter with the alcohol and by proper stirring be caused to dissolve therein, following which the prescribed amounts of alcohol and benzol or benzol alone, as the case may be, will be added.

Instead of alcohol and benzol, gasolene, which is likewise a non-solvent, and so acts merely as a diluent, may be used, while the addition of solvents such as acetone and camphor is permissible if desired. Moreover, in certain instances ethylene or propylene dichlorids, which are by-products of chlorhydrin manufacture, may be added.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A new composition of matter, comprising a solution of a cellulose ester in chlorpropyl acetate.

2. A new composition of matter, consisting of a solution of a cellulose ester in chlorpropyl acetate in admixture with other substances.

3. A new composition of matter, consisting of a solution of a cellulose ester in chlorpropyl acetate in admixture with an alcohol and benzol.

4. A new composition of matter, comprising a solution of cellulose nitrate in chlorpropyl acetate.

5. A new composition of matter, consisting of a solution of cellulose nitrate in chlorpropyl acetate in admixture with other substances.

6. A new composition of matter, consisting of a solution of cellulose nitrate in chlorpropyl acetate in admixture with alcohol and benzol.

7. A new composition of matter, consisting of the following ingredients in approximately the proportions stated, viz. 4 parts cellulose nitrate, 25 parts chlorpropyl acetate, 20 parts alcohol and 55 parts benzol.

8. A solvent for cellulose esters, comprising chlorpropyl acetate admixed with alcohol.

9. A solvent for cellulose esters, consisting of chlorpropyl acetate admixed with alcohol and benzol.

10. A solvent for cellulose esters, consisting of chlorpropyl acetate admixed with approximately an equal quantity of alcohol and approximately twice the quantity of benzol.

Signed by me, this 13th day of January, 1920.

MAX Y. SEATON.